United States Patent [19]
Ogawa

[11] Patent Number: 6,004,491
[45] Date of Patent: Dec. 21, 1999

[54] METHOD OF INTEGRATED MOLDING BY USE OF SILICONE RUBBER

[75] Inventor: Taro Ogawa, Kurashiki, Japan

[73] Assignee: Namba Press Works Co., Ltd., Kurashiki, Japan

[21] Appl. No.: 08/894,353

[22] PCT Filed: Oct. 21, 1996

[86] PCT No.: PCT/JP96/03047

§ 371 Date: Aug. 1, 1997

§ 102(e) Date: Aug. 1, 1997

[87] PCT Pub. No.: WO97/20679

PCT Pub. Date: Jun. 12, 1997

[30] Foreign Application Priority Data

Dec. 5, 1995 [JP] Japan ................................. 7-339908

[51] Int. Cl.[6] ................................................. B29C 44/02
[52] U.S. Cl. ..................... 264/46.4; 264/46.6; 264/309; 264/313; 264/321; 264/338
[58] Field of Search ................... 264/45.2, 46.4, 264/46.6, 46.8, 313, 309, 338, 321

[56] References Cited

U.S. PATENT DOCUMENTS

| | | | |
|---|---|---|---|
| 3,576,930 | 4/1971 | Watters et al. | 264/45.2 |
| 3,641,228 | 2/1972 | Fleck | 264/53 |
| 4,089,919 | 5/1978 | Sanson | 264/46.6 |
| 4,943,222 | 7/1990 | Nathoo | 425/89 |
| 4,946,640 | 8/1990 | Nathoo | 264/316 |
| 5,273,698 | 12/1993 | Thary | 264/46.6 |
| 5,389,318 | 2/1995 | Thary | 264/46.5 |
| 5,728,333 | 3/1998 | Tabata et al. | 264/313 |

FOREIGN PATENT DOCUMENTS

| | | | |
|---|---|---|---|
| 2-229026 | 3/1989 | Japan | B29C 51/26 |
| 2-293118 | 4/1990 | Japan | B29C 51/08 |
| 5-24104 | 7/1991 | Japan | B29C 51/10 |
| 1 243 225 | 11/1968 | United Kingdom | B29C 5/00 |

OTHER PUBLICATIONS

Supplementary European Search Report relating dated Nov. 6, 1998, relating to European Patent Application No. EP 96 93 5386 (European application corresponding to the subject U.S. application).

*Primary Examiner*—Allan R. Kuhns
*Attorney, Agent, or Firm*—Renner, Kenner, Greive, Bobak, Taylor & Weber

[57] ABSTRACT

A method of an integrated molding by integrally pressurizing and compressing by use of means of an upper mold and a lower mold, by use of a silicone rubber. A silicone rubber has excellent resiliency, thermal resistance, separating ability from the molds and the like. By use of a silicone rubber, a working efficiency for carrying out the integrated molding can be improved and a compressing timing can be easily taken. A method according to the invention comprises steps of: uniformly coating a mixture of a foamed urethane body on a silicone rubber horizontally held; and integrally pressurizing and compressing for a certain period by an upper mold and a lower mold. The step of uniformly coating the mixture is carried out by using a spraying technique. The silicone rubber can be attached on an inner surface of the lower mold by use of means of vacuum suction. By use of a silicone rubber: a working efficiency can be improved; a running cost can be reduced; a pressurizing timing is easily taken; and a deeply pressed shape can be molded.

7 Claims, 4 Drawing Sheets

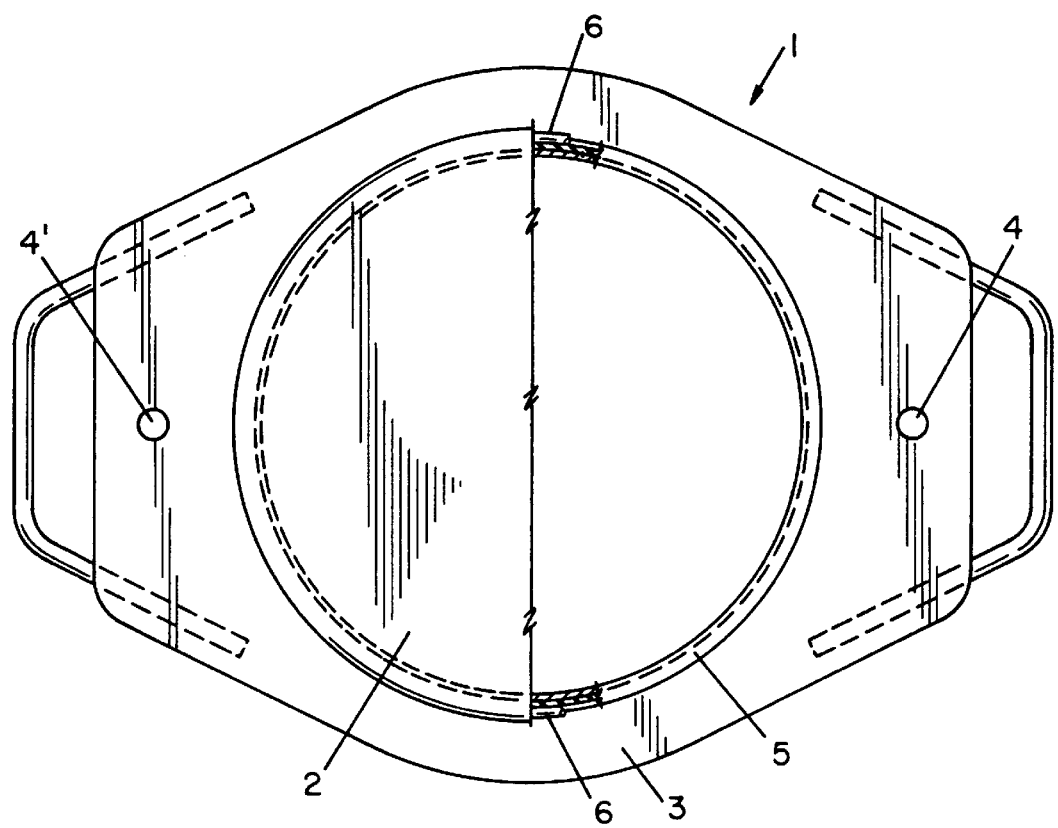
FIG. IA
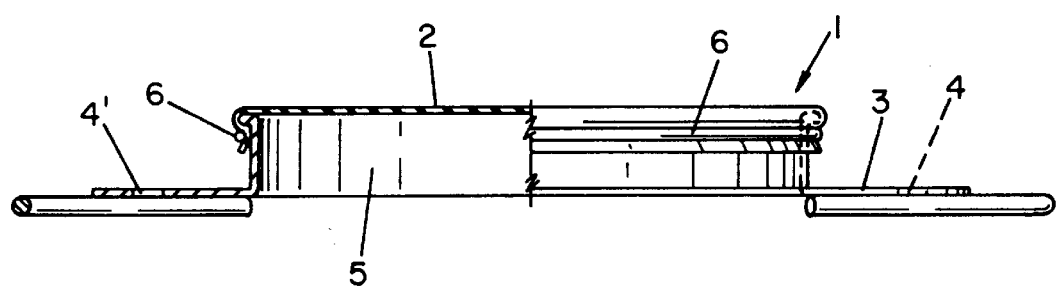
FIG. IB

METHOD OF INTEGRATED MOLDING BY USE OF SILICONE RUBBER

FIELD OF THE INVENTION

The present invention relates to an integrated molding method for molding into one body with another by use of a liquid reactive mixture of an urethane and, in particular, relates to a method of an integrated molding by use of a silicone rubber in which the integrated method is carried out by compressing in an upper mold and a lower mold.

BACKGROUND OF THE ART

A technique for manufacturing a desired three dimensional molded body is well known by, for example, U.S. Pat. No. 5,273,698. In that patent, it is disclosed that a method for manufacturing a three dimensional molded body comprises the steps of: uniformly coating a liquid reactive mixture of a urethane foam; and compressing the mixture for a certain period by use of means of an upper mold and a lower mold when a gas reaction thereof has been completed but the mixture is still in a visco-elastic flowing condition. Such a conventional technique is widely applied for seats of chairs or cars, articles relevant to the apparel industry such as a T-shirt, a cap or a bag and the like.

In general, a urethane is foamed by chemically reacting a mixture which comprises mainly two liquids. The mixture often used comprises isocyanate (ISO) and polyol (POL) as main components thereof and a catalyst and water as additional components thereof. Those components produce a foamed polyurethane or a foamed polyurea by foaming the mixture thereof and are, in fact, used for an integrated molding. As mentioned in the above U.S. Patent, the chemical reaction can be divided by two chemical reactions such as a gasification reaction which produces $CO_2$ and a solidification reaction. A foamed polyurethane is firstly expanded rapidly by the gasification reaction so that the volume thereof is expanded. When this gasification reaction is completed, the whole of the urethane is transformed into a solid condition through a gel condition. An integrated molding must be carried out when the gasification reaction thereof has been completed but the urethane is still in a visco-elastic flowing condition (this period is called as a tack free).

It is desirable to uniformly coat the foamed polyurethane over an object to be compressed. If such a coating is not uniform, a portion at which the gasification reaction is not completed will remain when compressing in an upper mold and a lower mold and a product will be cracked. Thus, in order to coat the urethane foam uniformly, a resilient sheet has been used in the art. Such a resilient sheet must be excellent in the resiliency and the durability, and this is because the foamed polyurethane is coated on the resilient sheet and is compressed together with the resilient sheet between the upper mold and the lower mold.

As disclosed in the aforementioned reference, a polyethylene film and the like is used as such a resilient sheet in the art. However, the polyethylene film is poor in stretchability. That is, once the film is elongated, the elongated film is not restored into the original state and is thinned so that the film can be broken. Also, the polyethylene film is poor in a separating ability from a mold i.e. the polyethylene sheet is not easily separated from the mold or the urethane after completing the integrated molding. Moreover, the running cost becomes higher because the durability is poor and the working efficiency is reduced because it takes a long time for replacing.

Meanwhile, as aforementioned, in fact, it is very difficult to rapidly compress in the tack free condition. The starting time of the tack free is different between a portion initially coated and a portion later coated, because the gasification reaction is started during the foamed polyurethane is uniformly coated thereon. Such a reaction time lag makes difficult to take a pressurizing timing. In particular, this time lag is considerable when coating over a wide area. Thus, a method of preheating a liquid mixture of a urethane is idealized in order to accelerate the gasification reaction by reducing the viscosity of polyurethane to shorten the coating time, however, such a hot foamed polyurethane can not be used directly to the aforementioned polyethylene film which is poor in thermal resistance.

The present invention is made in order to overcome those disadvantages of the resilient sheet used in the art.

Therefore, an object of the present invention is to provide a method of an integrated molding by use of a silicone rubber which is excellent in resiliency, stretchability, restoring ability into an original state and separating ability from a mold.

Another object of the present invention is to reduce a running cost and to improve a working efficiency by using a silicone rubber which has a high durability.

Still another object of the present invention is to provide a method of an integrated molding in which a pressurizing time can be easily taken by using a silicone rubber which has a high thermal resistance.

DISCLOSURE OF THE INVENTION

In order to achieve those objects, a silicone rubber is used as the aforementioned resilient sheet, in the present invention.

In accordance with the present invention, a method of an integrated molding by use of silicone rubber comprises the steps of:

mounting an object to be processed on the silicone rubber which is horizontally held; and compressing the object together with the silicone rubber by an upper mold and a lower mold.

The object can be coated on the silicone rubber by a spraying technique or a dispensing technique.

Also, it is possible to have an insert between the object and the silicone rubber.

The object is, for example, a liquid reactive mixture of a foamed urethane body.

Alternatively, the object is, for example, a liquid reactive mixture of an urethane elastomer.

The method according to the present invention preferably includes a step of pressurizing and holding the silicone rubber and the object for a desired time period while the silicone rubber is compressed together with the object between the upper mold and the lower mold.

Another method according to the present invention of an integrated molding by use of a silicone rubber comprises the steps of:

mounting an object to be processed on the silicone rubber which is horizontally held;

sucking the silicone rubber on an inner surface of a lower mold by means of vacuum suction so that the silicone rubber can follow a shape of the lower mold; and compressing the silicone rubber together with the object between an upper mold and the lower mold.

Preferably, the method can include a step of pressurizing and holding the silicone rubber and the object for a desired time period while the silicone rubber is sucked on the inner surface of the lower mold and is compressed together with the object between the upper mold and the lower mold.

BRIEF DESCRIPTION OF DRAWINGS

FIGS. 1(A) and 1(B) show a silicone rubber mounting devise used for a first embodiment according to the present invention.

BEST MODE FOR CARRYING OUT THE INVENTION

Figure 2A:
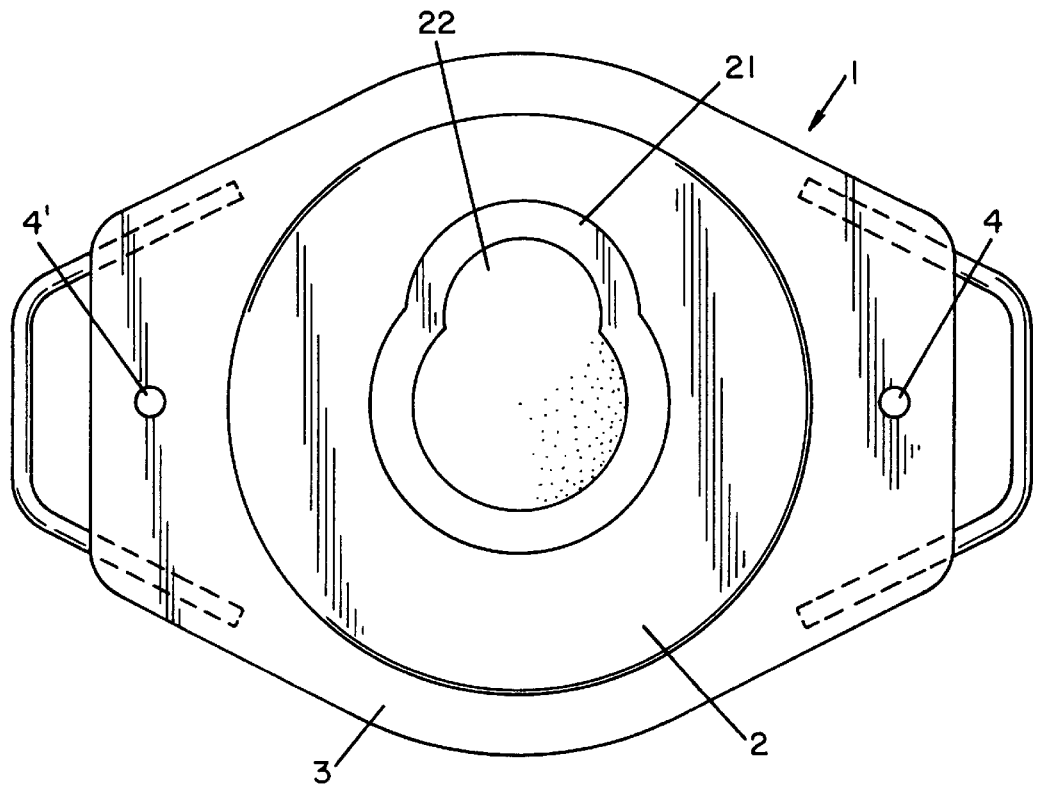
FIGS. 2(A) and 2(B) show that a mixture of a foamed urethane body is coated on the silicone according to a first step of the present invention.

A silicone rubber used for the present invention is commercially available and is, for example, SR-50 (Tigerspolymer Co.) or C-16 (Shinetsu Kagaku Kogyo Co.). The silicone rubber comprises a silicone natural rubber (polymer), a bulking agent, a dispersion accelerating agent and an additive such as a curing agent and the like and is produced by means of a press molding, a calendar molding, an injection molding or the like.

We now briefly explain about properties of a silicone rubber. A silicone rubber is very stable, and this is because the bonding energy of Si-O as a molecular structure is large. Thereby, it is excellent in a thermal resistance, an electrically insulating property and a chemical stability, in comparison with general organic rubbers. Also, it is excellent in resiliency, compressibility and cold resistance, and this is because the silicone molecule has a coil-structure and the intermolecular force thereof is small. Moreover, it is excellent in water repellency, a separating ability from a mold and the like, and this is because a methyl group positioned at an outer side of the coil-structure can be freely rotated.

We particularly refer to the resiliency, the thermal resistance, the chemical stability and the gas penetrability properties of a silicone rubber. In association with the resiliency thereof, a compressed permanent deformation is, in particular, excellent within a temperature range of 100° C.~200° C., in comparison with other organic rubbers. The thermal resistance thereof is considerably excellent in comparison with other organic rubbers. For example, it is possible to continuously use in semipermanent at 150° C. and is also possible to continuously use for 10000 hours at 200° C. In association with the chemical stability, it is excellent in oil resistance, solvent resistance and chemical resistance, so that it is hardly influenced by a dilute acid or a dilute alkali. In association with the gas penetrability, a penetrating rate of $CO_2$ thereof is about 200 times of that of polyethylene and a vapor penetrability thereof is about 14 times of that of polyethylene.

We now explain about advantages provided in practice by those properties when molding a foamed urethane body in one with another by an integrated molding. As aforementioned, an integrated molding is carried out by compressing a resilient sheet together with a foamed polyurethane, which is coated on the resilient sheet, by an upper mold and a lower mold. The resilient sheet is immediately removed from the mold after compressing for a certain time period, and then, the resilient sheet is again used for a step of an integrated molding. In this working cycle, the resilient sheet must be excellent in resiliency and separating ability from the mold, as a first requirement. Such a requirement is successfully satisfied by the aforementioned properties of the silicone rubber. As a second requirement, the resilient sheet must be excellent in thermal resistance. This is because the foamed polyurethane is preheated to spray and produces a heat caused by a gasification reaction thereof, and thereby it becomes a very high temperature. This second requirement is also successfully satisfied by the aforementioned properties of the silicone rubber. As a third requirement, the resilient sheet must be excellent in chemical stability. This is because an erosion caused by isocyanate, polyol and other catalysts, which are compounds of a foamed polyurethane, must be prevented. This third requirement is also successfully satisfied by the aforementioned properties of the silicone rubber. In addition to those three requirements, a basis of particularly selecting the silicone rubber is an excellent gas penetrability thereof. A large amount of $CO_2$ and vapor are produced by the gasification reaction of the reactive mixture of the urethane and most thereof is dispersed from an outer surface portion of the urethane foam into atmosphere, and a reaction rate about a bottom surface portion thereof and a surface portion contacted with the resilient surface which hardly produces a gas is relatively slow thereby. As a result, those portions remain as a portion which has not been reacted, and a product is cracked thereby. As aforementioned, a silicone rubber is excellent in the penetrability of $CO_2$ and vapor, so that $CO_2$ and vapor produced by the urethane foam about a surface portion contacted with the silicone rubber can be dispersed into atmosphere, and a nonuniformity of the reaction rate is solved thereby.

In accordance with those reasons, it has been found to apply a silicone rubber for the resilient sheet.

Figure 2B:
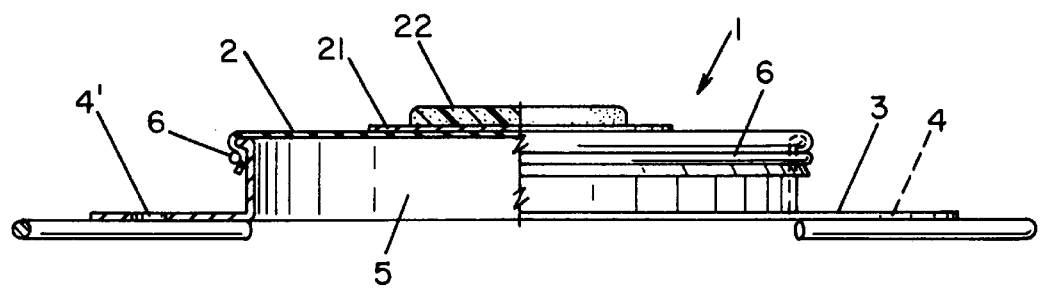
Figure 3:
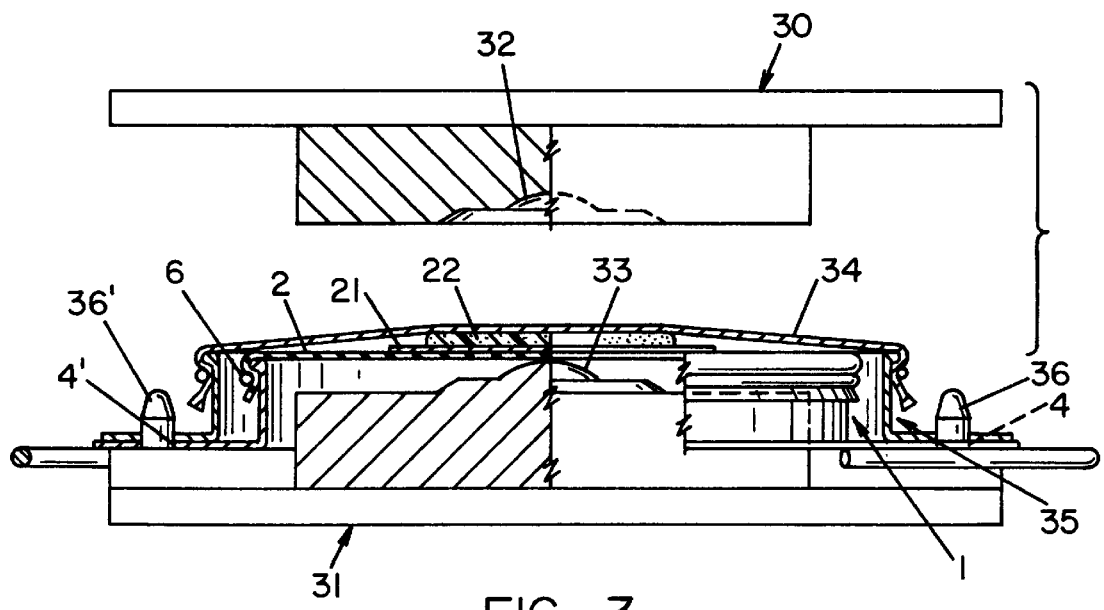
FIG. 3 shows an integrated compression according to a second step of the present invention.

We now describe the present invention with referring to drawings. FIGS. 1 to 3 show a first embodiment relevant to an integrated molding for molding a relatively thin three dimensional molded body, in accordance with the present invention.

FIG. 1 shows a silicone rubber mounting device for carrying out a method according to the present invention. FIG. 1(A) is a plan view of the device, and FIG. 1(B) is a side view thereof. The silicone rubber mounting device 1 is formed of a hollowed cylinder portion 5, a flange portion 3 extended from one end of the cylinder portion, a silicone rubber 2 attached to the cylinder portion 5 by a rubber ring 6 so that an open end of the cylinder portion 5 can be covered with the silicone rubber 2, and holes 4, 4' for positioning the device. The silicone rubber 2 is horizontally tensioned by a constant tensile force, and a thickness thereof is 0.2 to 2 mm, preferably 0.5 to 1 mm. A circumferential end of the silicone rubber is attached to the opening end of the cylinder portion 5. The opening end of the cylinder portion 5 is curled outward not to come off the rubber ring 6. In this embodiment, a diameter of a surface area for mounting the silicone rubber 2 is preferably about 30 cm to 1 m. Thus, it is desirable for printing on a relatively thin three dimensional article such as a T-shirt and the like.

A method of the present invention comprises the steps of: coating a reactive mixture of a foamed urethane body on a silicone rubber horizontally held; and compressing the silicone rubber together with the foamed urethane body between an upper mold and a lower mold.

FIG. 2 illustrates a first step of the present invention in which a reactive mixture of a foamed urethane body is coated on a silicone rubber horizontally held. The foamed urethane body 22 is a foamed polyurethane or a foamed polyurea made by foaming a liquid reactive mixture consisting of polyol and isocyanate as main components thereof. A liquid mixture of urethane is coated by a spraying technique or a dispensing technique. When coating by the spraying technique, those two components are preferably pre-heated.

The foamed urethane body 22 is coated directly on the silicone rubber 2 and may also be coated through a textile material 21. In this case, a plastic film or a slab urethane can be laminated on a surface of the textile material 21.

FIG. 3 illustrates a second step of the present invention in which a silicone rubber is compressed together with a foamed urethane body between an upper mold and a lower mold. An integrated compression apparatus comprises an upper mold 30 and a lower mold 31. Pins 36, 36' for positioning the silicone rubber mounting device are provided on the lower mold 31. Those pins 36, 36' and the holes 4, 4' of the silicone rubber mounting device are engaged, and thereby the foamed urethane body on the silicone rubber is aligned with a concave and convex surface 32, 33 of the upper and lower molds. In the case of manufacturing a T-shirt with a three dimensional print, a surface material 34 extended in a surface material mounting device 35 is further mounted thereon. The integrated molding is made by simultaneously compressing the surface material 34, the foamed urethane body 22, a textile material 21 and the silicone rubber 2. The foamed urethane body mixture 22 is compressed with preferably a force of 1256 kg(4 kg/cm$^2$×200 mm φ) for 30 seconds to 3 minutes in a timing of the tack free. It is very difficult to take a pressurizing timing, however, it is relatively easier to take the pressurizing timing by use of a silicone rubber according to the present invention. That is, in order to coat a urethane reactive mixture uniformly and to prevent a reaction time lag thereof, a spraying technique in which the preheated mixture is sprayed is preferably employed. It is possible to coat uniformly for a short time by the spraying technique, and this is because the silicone rubber is excellent in resiliency and thermal resistance. As a result, the reaction time lag locally occurred is eliminated and the pressurizing timing until the tack free can be easily determined.

The embodiment of a relatively thin three dimensional molded body has been described above. Alternatively, the silicone rubber can be substituted for an urethane elastomer, and even though the urethane elastomer is used, the same effects can be obtained by the same method.

We now describe an alternative method of the present invention. This alternative method according to the present invention comprises steps of: coating a reactive mixture of a foamed urethane body uniformly on a silicone rubber which is horizontally held; sucking the silicone rubber on an inner surface of a lower mold by means of vacuum suction; and compressing the silicone rubber together with the reactive mixture of the foamed urethane body between an upper mold and the lower mold.

An embodiment of the alternative method of the present invention is described, and a relatively thick three dimensional molded body is manufactured in this embodiment. FIGS. 4 and 5 schematically show a method for manufacturing a part of a seat for a car.

Figure 4A:
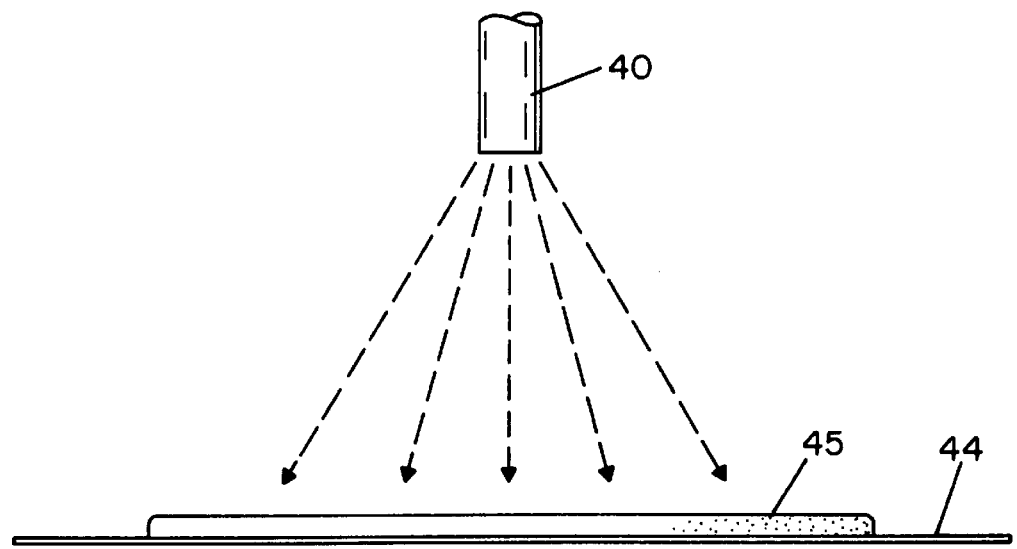
FIG. 4(A) shows that a liquid mixture of a foamed urethane body is coated by a spraying technique according to a first step of an alternative method of the present invention.
Figure 5:
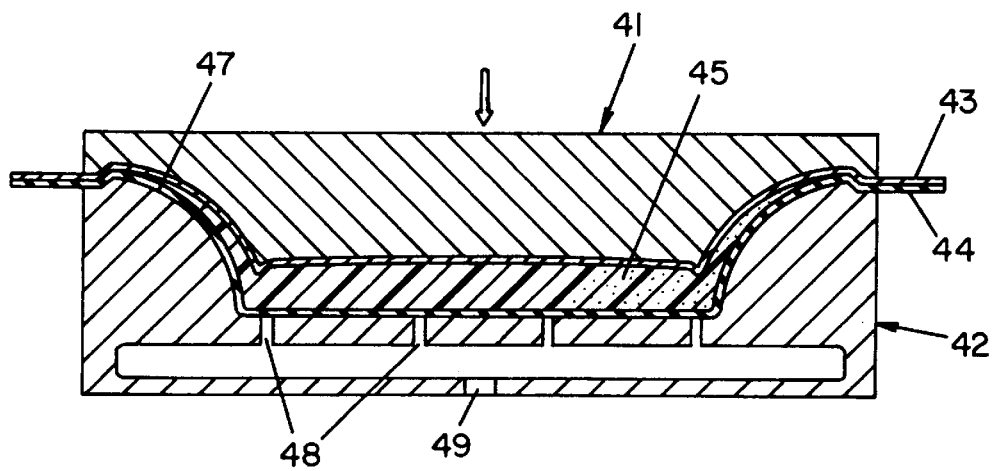
FIG. 5 shows an integrated compression by a third step according to the alternative method of the present invention.

FIG. 4(A) shows a first step of the alternative method of the present invention in which the reactive mixture of the foamed urethane body is coated on the silicone rubber which is horizontally held. A preheated liquid reactive mixture 45 of polyol and isocyanate is coated uniformly on the silicone rubber 44 by a liquid mixture spraying nozzle 40 as a spray technique. The silicone rubber 44 used in this embodiment can be the same as the silicone rubber used in the first embodiment. Preferably, in order to manufacture a large and deeply pressed molded body, the silicone rubber 44 used in this embodiment has a wide width and a thickness of about 1 mm to 10 mm. The silicone rubber 44 is horizontally held by the same mounting device (not shown) as that of the first embodiment.

Figure 4B:
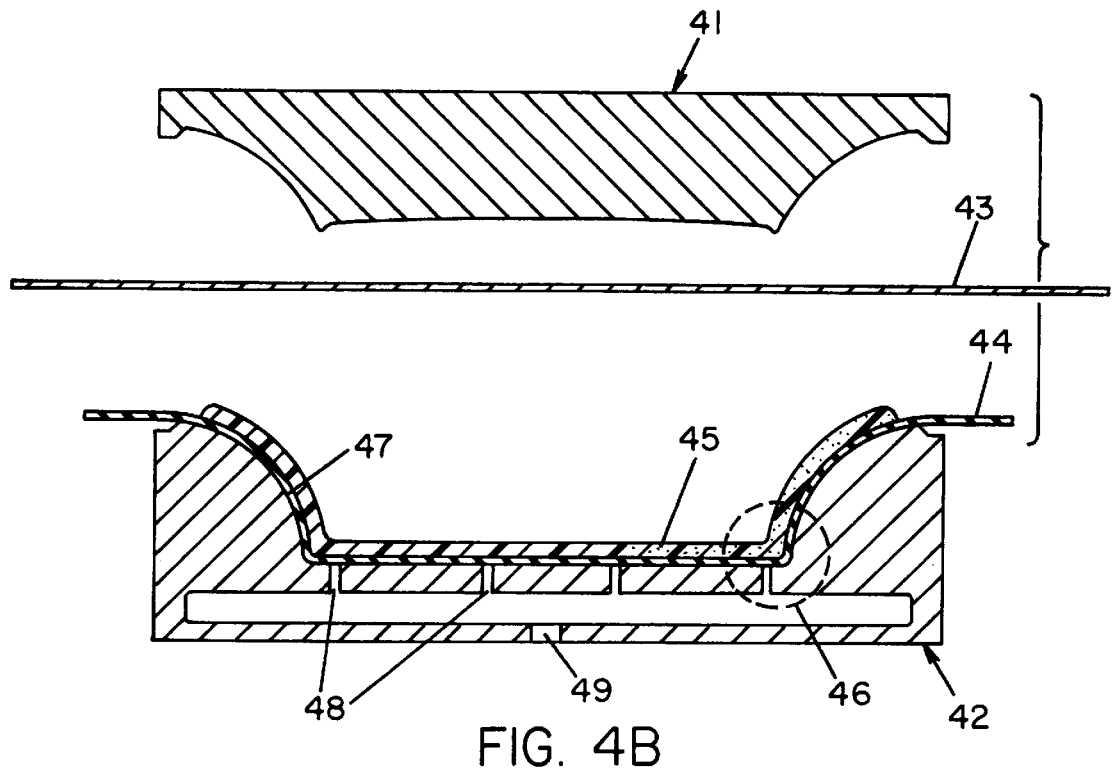
FIG. 4(B) shows that a silicone rubber is sucked on an inner surface of a lower mold by means of vacuum suction in accordance with a second step of the alternative method of the present invention.

FIG. 4(B) shows a second step of the alternative method of the present invention in which the silicone rubber is sucked on the inner surface of the lower mold by means of vacuum suction. Before compressing, the silicone rubber 44, which is mounting the urethane mixture thereon, is rapidly sucked on the inner surface 47 of the lower mold 42 by means of vacuum suction. A plurality of small holes are provided on the inner surface 47 of the lower mold 42, so that air between the silicone rubber 44 and the lower mold 42 can be evacuated from an exhaust 49 through those small holes 48 by a vacuum pump (not shown) as means of vacuum suction. As a result, the silicone rubber 44 is completely attached and sucked on the inner surface 47. That is, in a deeply pressed shape of the mold as shown in FIG. 4(B), if an integrated compression is carried out by a common method, a lower corner 46 of a molded body will be rounded or thinned by a restoring force of the silicone rubber 44, and as a result, the molded body can not follow a shape of the lower mold. Thus, in the alternative method of the present invention, the silicone rubber 44 is followed along the shape of the lower mold before compressing and is then compressed in one with another, and the deeply pressed lower portion can be molded thereby. In addition, in such an integrated compression, a surface material 43 can be included.

FIG. 5 shows a third step of the alternative method of the present invention in which the silicone rubber is compressed together with the reactive mixture of the foamed urethane body between the upper and the lower molds. The desired optimal values of the pressurizing timing, the pressure and the pressurizing time period can be selected as well as those of the first embodiment. The vacuum suction of the silicone rubber 44 is continuously carried out during the compression. An embodiment of a relatively thick three dimensional molded body has been described in the above. Alternatively, the foamed urethane body can be substituted for an urethane elastomer, and even though the urethane elastomer is used, the same effects can be obtained by the same method.

In accordance with the present invention, a method of an integrated molding by use of silicone rubber which is excellent in resiliency, stretchability, restoring ability and separating ability from a mold is provided.

Also, in accordance with the present invention, it is possible to reduce the running cost and to improve the working efficiency by use of a silicone rubber which has a high durability.

Moreover, in accordance with the present invention, the pressurizing timing of the integrated compressing is easily taken by use of a silicone rubber which has a high thermal resistance.

Furthermore, in accordance with the present invention, a corner portion of a molded body having a deeply pressed shape can be molded.

It is claimed:

1. A method of compression molding a three-dimensional foamed body comprising the steps of:

preparing a fluid reactive foaming material;

mounting a sheet of silicone rubber in a horizontal position;

substantially uniformly coating said fluid reactive foaming material on said sheet of silicone rubber;

permitting a gasification reaction of the fluid reactive material to proceed to completion while uniformly coated on said sheet of silicone rubber to form an expanded material, compressing and holding said expanded material and the sheet of silicone rubber between an upper mold and a lower mold while said expanded material is in a viscoelastic flowing condition; and separating said upper mold and said lower mold to release the completed foamed body.

2. A method of compression molding according to claim 1, including the step of maintaining said sheet of silicone rubber horizontally tensioned.

3. A method of compression molding according to claim 1, including the step of mounting said sheet of silicone rubber on a hollow cylinder which receives said lower mold.

4. A method of compression molding according to claim 1, wherein the step of preparing the fluid reactive material includes the step of preheating said fluid reactive foaming material to a predetermined temperature.

5. A method of compression molding according to claim 4, wherein said coating of said fluid reactive foaming material on said sheet of silicone rubber employs a spraying technique.

6. A method of compression molding according to claim 1, wherein said coating of said fluid reactive foaming material on said sheet of silicone rubber employs a spraying technique.

7. A method of compression molding according to claim 1, wherein said coating of said fluid reactive foaming material on said sheet of silicone rubber employs a dispensing technique.

* * * * *